July 19, 1960 — C. M. SIMMONS — 2,945,374
TORQUE INDICATING GAUGE
Filed Sept. 27, 1956

INVENTOR.
CHARLES M. SIMMONS
BY
ATTORNEY

United States Patent Office 2,945,374
Patented July 19, 1960

2,945,374

TORQUE INDICATING GAUGE

Charles M. Simmons, 1 Franklin Ave., White Plains, N.Y.

Filed Sept. 27, 1956, Ser. No. 612,434

2 Claims. (Cl. 73—1)

This invention relates to a device for indicating the torque setting on a power-driven rotary tool, such as a power screwdriver or a power nutsetter.

Power screwdrivers and power nutsetters have come into widespread usage because of the rapidity with which they operate. Many of these devices have a positive clutch which will apply the torque up to the limit of capacity of the tool. Positive clutch models are restricted in use to those applications where the maximum torque applied is not important, or where the operator is a skilled mechanic.

Many models are provided with an adjustable clutch, which allows the tool to be pre-set to the torque requirement of the particular job. The clutch jaws slip automatically when the desired tension has been reached. This type of tool is very flexible, and can be used in a wide variety of applications. Its usefulness is restricted, however, except where there is ready access to a device for measuring the torque to which the tool is adjusted.

An object of the present invention is to provide a simple and inexpensive device for indicating the torque of a rotary power tool such as a power screwdriver or nutsetter.

A related object of the invention is to provide a device of the character described having an indicating gauge showing directly the torque applied to the device by a power screwdriver or nutsetter.

Another object of the invention is to provide a simple yet rugged torque indicating device which may be used to determine and inspect the torque setting on both positive parts and adjustable clutch power rotary tools.

These and other objects of the invention are achieved in a preferred embodiment of the invention by a torque indicating device comprising a body mounted on a support and having a cylinder formed therein which is closed at one end. A piston is reciprocably mounted in the cylinder for movement toward and away from the closed end thereof. The piston carries a sealing ring which cooperates with the closed end of the cylinder, to form a closed chamber having in effect a movable wall constituted by the piston. The chamber is filled with liquid, and the sealing ring around the piston prevents leakage of the liquid from the chamber around the piston.

A gauge is secured to the body and is operatively connected at an aperture opening into the chamber, through which the liquid can flow to actuate the gauge. The gauge is of conventional structure, having a spring-biased plunger connected to a pointer. The plunger is activated on movement of the body of liquid in the chamber as the piston moves in the cylinder. The spring of the gauge resists movement of the plunger and of the body of liquid and returns the plunger and the indicating pointer of the gauge to a datum or zero position when the liquid in the chamber is free of the external force applied by the piston.

A piston rod is secured to the piston head and protrudes from the body into a gland. A stud is threaded into the gland in axial alignment with the piston rod, and within the gland the stud engages a ball bearing which is interposed between the stud and the piston rod. The head of the stud, exterior of the gland, is adapted to be engaged by a rotary power tool so that as the stud is rotated by the power tool, the torque of the tool is transmitted through the bearing to move the piston rod, the piston, and the body of liquid in the cylinder, thereby to actuate the gauge and cause the gauge to measure the torque transmitted by the power tool.

The gauge dial is calibrated in units of torque so that the torque applied by the power tool may be read directly. When the gauge is used with an adjustable clutch power tool, by adjusting the power tool repeatedly, if required, and remeasuring its torque after each adjustment, the tool can be set to any desired torque.

The threaded stud which is engaged by the power tool may have a square, slotted head, so that it may be engaged directly by both power screwdrivers and power nutsetters.

Figure 1:
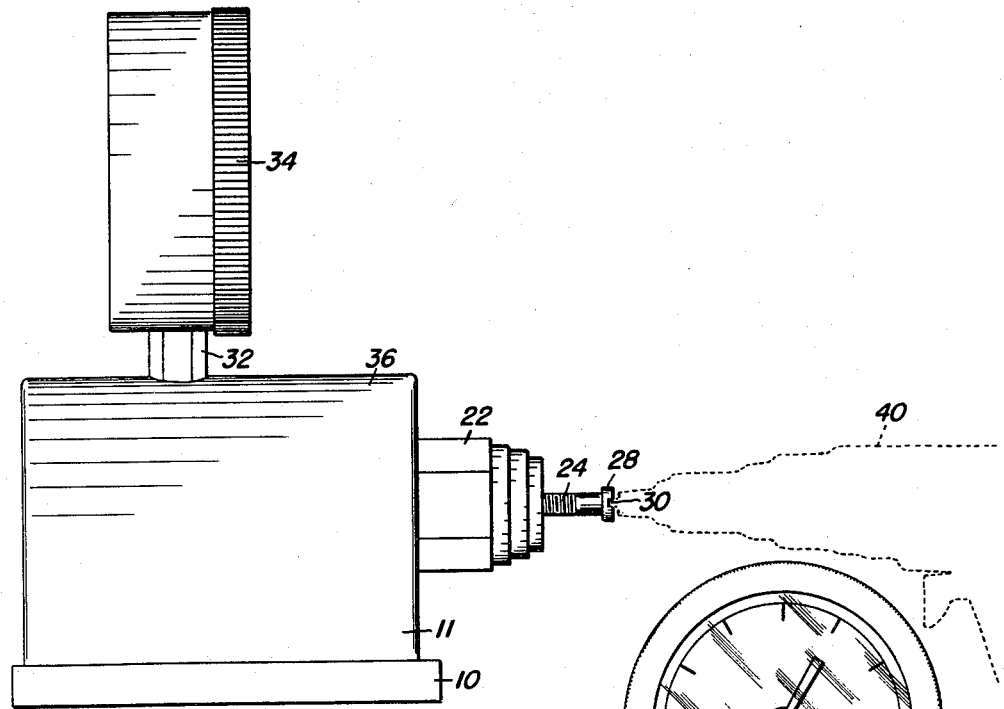
Fig. 1 is a side elevational view of one embodiment of a torque indicating device made according to this invention.
Figure 2:
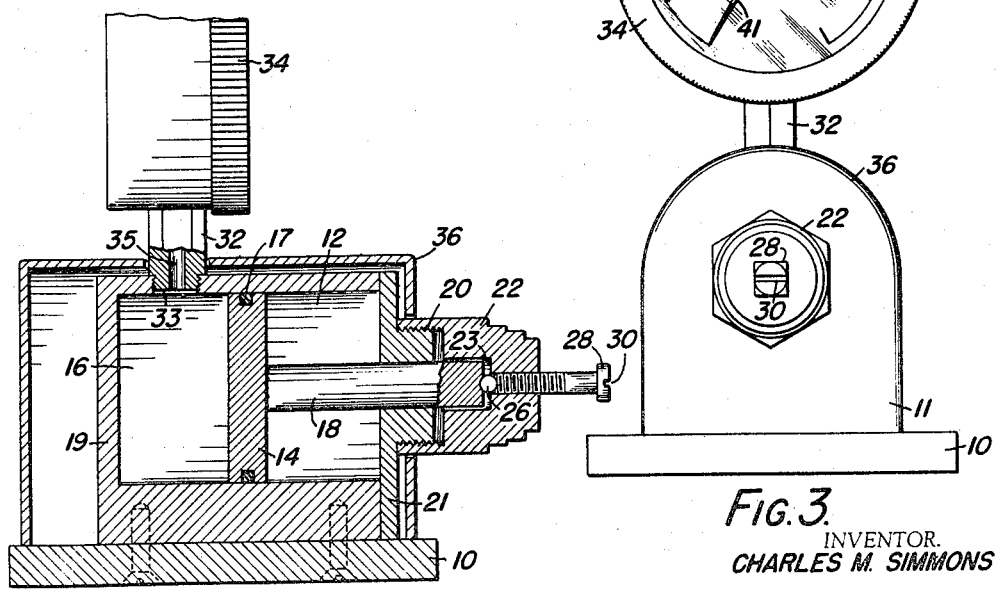
Fig. 2 is a part side elevation, but principally an axial section thereof.

Referring now to the drawing by numerals of reference, the torque indicating device includes a supporting base 10 on which is mounted a rugged body 11 which is bored to provide a hydraulic cylinder. The head 14 of a piston engages a body of liquid 16 enclosed in one end of the cylinder and is adapted to apply pressure to it. The piston head traps the liquid 16 in the cylinder between the piston head and the end wall 19 of the cylinder, thereby, in effect, forming a liquid chamber having a movable partition wall 14. The piston head carries an O-ring 17 or other sealing means which prevents leakage of the liquid from said one end of the cylinder along the piston.

Figure 3:
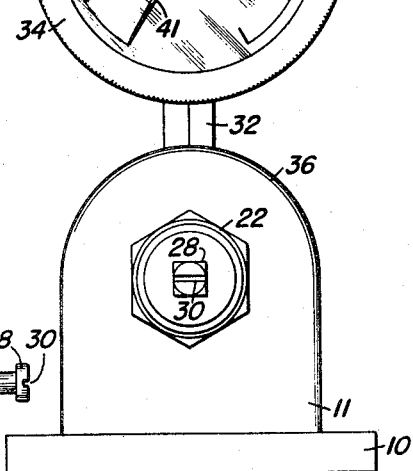
Fig. 3 is a front elevation thereof.

The piston has an integral piston rod 18 which protrudes through the neck 20 of the end cap 21 of the body 11 into a gland 22 that is threaded on the neck 20. A stud 24 is threaded into the gland 22 and is axially aligned with the piston rod 18. Interposed between the piston rod 18 and the threaded stud 24 and engaged by each is a ball bearing 26. The head 28 of the stud is square, as best shown in Fig. 3, and is slotted as indicated by the numeral 30.

The stem 32 of a conventional gauge 34 which is adapted to measure movement of liquid is threaded directly into an aperture 33 in the body 11, so that the actuating plunger 35 of the gauge is in direct contact with the liquid 16 in the chamber formed between the piston head 14 and the end wall 19. The plunger 35 is spring-biased to a zero position. The gauge has a pointer 41 and is calibrated to read directly in inch-pounds to indicate the torque applied by the power tool.

To improve the appearance of the device and protect it, the body 11 is enclosed in an outer jacket 36 which has appropriate apertures for the passage therethrough of the gauge 34 and the gland 22.

In the operation of the device, as shown in Fig. 1, a power tool such as a screwdriver 40 is operatively engaged with the head 28 of the stud 24. When the tool is actuated, the stud 24 is rotated and moves inwardly of the gland 30. The stud 24 applies a force to the ball bearing 26 which is transmitted through the piston to the liquid in the chamber between the piston and the end wall 19. The body of liquid, operating through the aperture 33 on the plunger 35 of the gauge, actuates the gauge and provides a direct measure of the applied torque in inch-pounds.

After the torque reading has been obtained, the stud 24 is backed off sufficiently to permit the piston to move away from the end wall 19, so that the piston rod 18 moves outwardly of the cylinder. This outward movement is arrested by the shoulder 23 in the gland 22. The spring in the gauge (not shown) returns the plunger 35 to its normal position, thus permitting the pointer 41 of the gauge to return to a zero reading.

When a positive clutch power tool is used to rotate the stud 24, the reading of the gauge indicates the maximum torque which is exerted by the tool. When it is desired to set the torque on an adjustable clutch power tool, the power tool is adjusted repeatedly, if required, and its torque is remeasured after each adjustment. In this way, the tool can be set to any desired torque.

There is thus provided an extremely simple torque indicating device which provides an instantaneous reading of the torque of any rotary tool. Its construction may be as rugged as desired yet it is an inexpensive indicator. It retains its calibration over long periods of use. Through the use of threaded studs having a plurality of different head sizes, power nutsetters having jaws of any desired size may be tested with a minimum of trouble.

While the invention has been described in connection with a specific embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described my invention, what I claim is:

1. Apparatus for measuring the torque exerted by a power tool, comprising a cylinder which is closed at one end, a piston reciprocable in said cylinder, said one end of said cylinder forming with the adjacent, opposed side of said piston a chamber, the volumetric capacity of which varies with the reciprocation of said piston, means for preventing leakage of liquid from said opposed side of said piston to the other side thereof, a pressure gauge, liquid conducting means connecting said pressure gauge to said chamber, a body of liquid filling said chamber and said liquid conducting means so that movement of the body of liquid between said chamber and said conducting means during reciprocation of said piston is measured by said gauge, a closure for said other end of said cylinder, a rod secured at its inner end to said piston and projecting from said other side of said piston but having its outer end disposed within said closure, a rotatable stud rotatably threaded into said closure in axial alignment with said rod, said stud having a head projecting externally beyond said closure for engagement and rotation by a power tool whose torque is to be measured, and an antifriction thrust bearing disposed between the inner end of said stud and the opposed outer end of said rod to transmit directly to said rod the rectilinear movement of said stud as it is threaded into said closure.

2. Apparatus for measuring the torque exerted by a power tool as claimed in claim 1, in which said gauge is threaded into said cylinder, and said liquid conducting means is a passage in said cylinder directly connecting said gauge with said chamber.

References Cited in the file of this patent
UNITED STATES PATENTS

| | | |
|---|---|---|
| 2,063,622 | Pfeiffer | Dec. 8, 1936 |
| 2,443,049 | McVey | June 8, 1948 |
| 2,635,453 | Gentry et al. | Apr. 21, 1953 |
| 2,795,131 | Booth | June 11, 1957 |